(12) United States Patent
Nguyen et al.

(10) Patent No.: US 6,499,046 B1
(45) Date of Patent: Dec. 24, 2002

(54) SATURATION DETECTION APPARATUS AND METHOD THEREFOR

(75) Inventors: Huy Van Nguyen, Round Rock, TX (US); Charles Philip Roth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,545

(22) Filed: May 20, 1999

(51) Int. Cl.[7] ................................ G06F 7/38; G06F 11/00
(52) U.S. Cl. ........................................ 708/552; 708/530
(58) Field of Search ........................ 708/530, 552, 708/498, 490, 207; 304/146.2

(56) References Cited

U.S. PATENT DOCUMENTS

| | | | | |
|---|---|---|---|---|
| 4,760,374 A | * | 7/1988 | Moller ........................ | 708/207 |
| 4,774,688 A | * | 9/1988 | Kobayashi et al. .......... | 708/207 |
| 5,369,438 A | | 11/1994 | Kim ............................ | 708/552 |
| 5,448,509 A | | 9/1995 | Lee et al. .................... | 708/530 |
| 5,469,376 A | * | 11/1995 | Abjallah ...................... | 708/207 |
| 5,677,860 A | | 10/1997 | Yazawa et al. .............. | 708/530 |
| 5,847,978 A | | 12/1998 | Ogura et al. ................ | 708/552 |

* cited by examiner

Primary Examiner—Tan V. Mai
(74) Attorney, Agent, or Firm—Barry S. Newberger; Winstead Sechrest & Minick P.C.; Robert M. Carwell

(57) ABSTRACT

An apparatus for saturation detection and a method therefor are implemented. Selection circuitry selects a data value signal for outputting between an output from an adder receiving a pair of input operands, and a plurality of saturation value signals. Each input operand may include a plurality of subvector operands of a preselected data type, each data type has having a corresponding length. The selection circuitry selects the data value signal in response to a plurality of second signals. The second signals are generated from carry-out signals from the subvector operands, and first signals that are generated using instruction information for the executing instruction. The second signals may be generated by logically combining the first signals with carry propagate, carry generate and carry-out signals from carry lookahead logic receiving the subvector operands as input.

24 Claims, 6 Drawing Sheets

SATURATION DETECTION APPARATUS AND METHOD THEREFOR

CROSS-REFERENCE TO RELATED APPLICATION

The present invention is related to U.S. patent application Ser. No. 09/315,546 entitled "VECTOR COMPARE AND MAXIMUM/MINIMUM GENERATION APPARATUS AND METHOD THEREFOR," which is hereby incorporated herein by reference.

TECHNICAL FIELD

The present invention relates in general to data processing systems, and in particular, to vector arithmetic operations in a data processor.

BACKGROUND INFORMATION

Vector processing extensions to microprocessor architectures are being implemented to enhance microprocessor performance, particularly with respect to multimedia applications. One such vector processing extension is the Vector Multimedia Extension (VMX) to the Power PC microprocessor architecture ("Power PC" is a trademark of IBM Corporation.) VMX is a single instruction multiple data (SIMD) architecture. In a SIMD architecture, a single instruction operates on multiple sets of operands. For example, an instruction having thirty-two bit operands may operate on the operands in bytewise fashion as four eight-bit operands, as sixteen bit half-word operands, or as word length operands of thirty-two bits.

Integer arithmetic instructions may have both modulo, that is, wrap around, and saturating modes. The mode determines the result of the operation implemented by the instruction when the result overflows the result field, either a byte-length field, a half-word-length field, or a word length field, depending on the data type being operated on by the instruction. In modulo mode, the result truncates an overflow or underflow for the length (byte, half-word, or word) and type of operand (signed or unsigned). In saturating mode, the result is clamped to its saturated value, the smallest or largest representable value in the field.

To implement these instructions, three tasks need to be performed. An intermediate result is produced, using a single adder, which may be embodied in an arithmetic unit, in accordance with the specific instruction being executed. It is then determined if the intermediate result fits into the field corresponding to the length of the operand. Then, the appropriate result must be selected, either the intermediate result, the truncated overflow or underflow, if in modulus mode, or the saturation value, if in saturating mode.

The task of determining if an intermediate result fits into its field, and the task of selecting the appropriate value as a final result may be complicated and time consuming. In particular, these tasks are complicated in that the instructions support different data types, that is, subvector operands having different lengths, as described hereinabove, each of which may be either signed or unsigned. Consequently, it becomes difficult to meet cycle time requirements if the three tasks are performed sequentially.

Thus, there is a need in the art for apparatus and methods for implementing vector integer arithmetic instructions, which are sufficiently fast to meet cycle time requirements. In particular, there is a need in the art for performing, in parallel, the tasks of generating an intermediate result, determining if the intermediate results fits into a preselected field, and selecting a mode dependent result value.

SUMMARY OF THE INVENTION

The aforementioned needs are addressed by the present invention. Accordingly, there is provided, in a first form, a saturation detection apparatus. The saturation detection apparatus includes a saturation detection unit having first and second operand inputs operable for receiving first and second vector operands, the saturation detection unit operable for receiving an instruction signal, the saturation detection unit outputting a plurality of selection signals in response to the first and second operands and the instruction signal. Selection circuitry is also included that is operable for receiving the plurality of selection signals, a vector arithmetic result signal, a plurality of saturation value signals, wherein the selection circuitry selects one of the result signal and the plurality of the saturation value signals in response to the plurality of selection signals.

There is also provided, in a second form, a method of saturation detection. The method generates a set of first signals in response to an executing instruction, and generates a set of second signals in response to first and second carry-out signals and the set of first signals. The method also includes selecting for outputting one of a set of output signals including a result signal and a predetermined set of saturation value signals in response to the set of second signals, wherein the first and second carry-out signals are generated in response to a pair of subvector operands, and the result signal is generated in response to the executing instruction.

Additionally, there is provided, in a third form, a data processing system including a central processing unit (CPU), and a memory operable for communicating instructions and operand data to the CPU, in which the CPU further includes instruction decode circuitry operable for receiving the instructions, an arithmetic unit operable for receiving the operand data, and outputting a result signal in response to the operand data, and an instruction, and saturation detection circuitry, coupled to the memory. The saturation detection unit is operable for receiving the operand data from the memory, the saturation detection circuitry also being operable for selecting a one of a plurality of output signals, wherein the plurality of output signals includes the result signal and a preselected set of saturation signals, the saturation detection circuitry selecting the one of the plurality in response to the operand data and an instruction signal from the decode circuitry.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
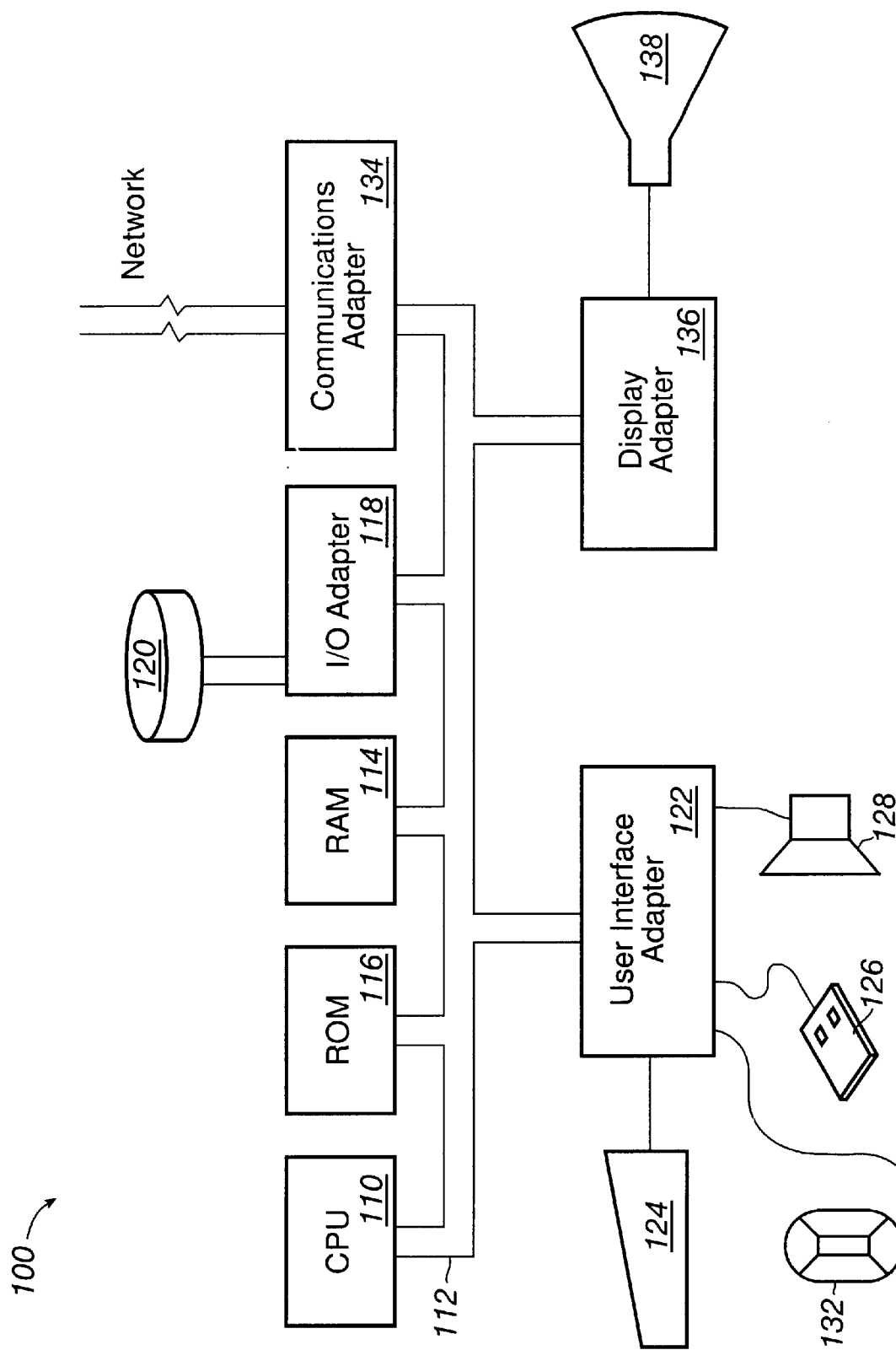
FIG. 1 illustrates, in block diagram form, a data processing system in accordance with an embodiment of the present invention.

A saturation detection mechanism is provided. A set of qualifiers, is generated. The value of these signals depends on the vector operation, and the mode thereof, to be performed. A select signal is generated in response to the qualifiers and result carry-out signals. The select signals are used to control a multiplexer that selects the final result of the instruction. Inputs to the multiplexer include the output of the vector operation and saturated values of the corresponding data types.

In the following description, numerous specific details, such as, specific operand lengths, are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 1 12. Data processing system 100 includes random access memory (RAM) I 14, read only memory (ROM) I 16, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 1 10 may include other circuitry not shown herein, which will include circuitry commonly found within a microprocessor, e.g., execution unit, bus interface unit, arithmetic logic unit, etc. CPU 1 10 may also reside on a single integrated circuit.

Figure 2:
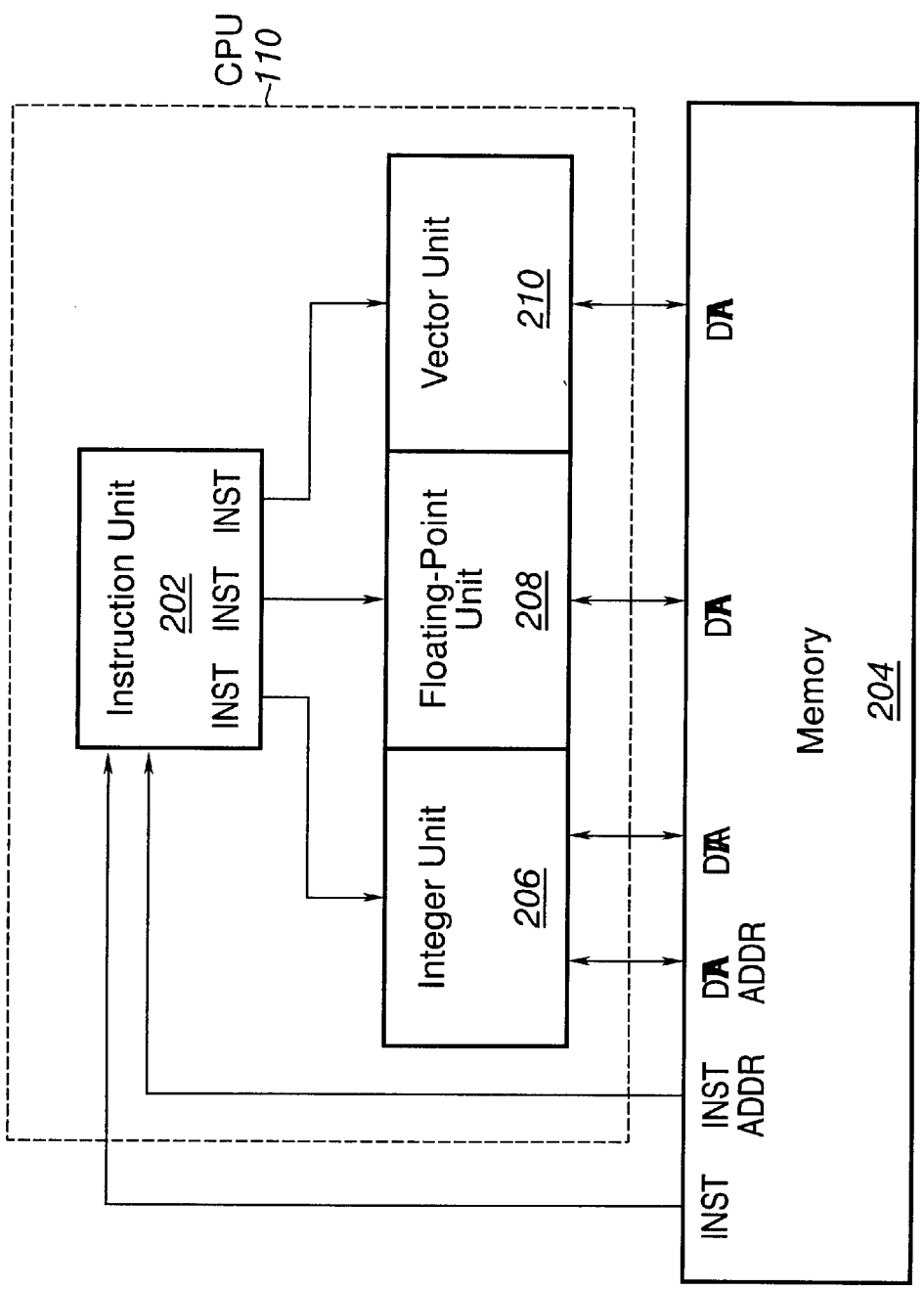
FIG. 2 illustrates, in block diagram form, a central processing unit in accordance with an embodiment of the present invention.

Refer now to FIG. 2 illustrating CPU 110 in further detail. CPU 110 includes instruction unit 202 that receives instructions passed from memory 204. Instruction unit 202 partially decodes the instructions and queues them for issuance to the appropriate one of integer unit 206, floating point unit 208 and vector unit 210. Integer unit 206, floating point unit 208 and vector unit 210 execute the instructions, and perform integer operations, floating point operations and vector operations, respectively. Saturation detection in vector fixed point operations, in accordance with an embodiment of the present invention, may be included in vector unit 210.

Figure 3A:
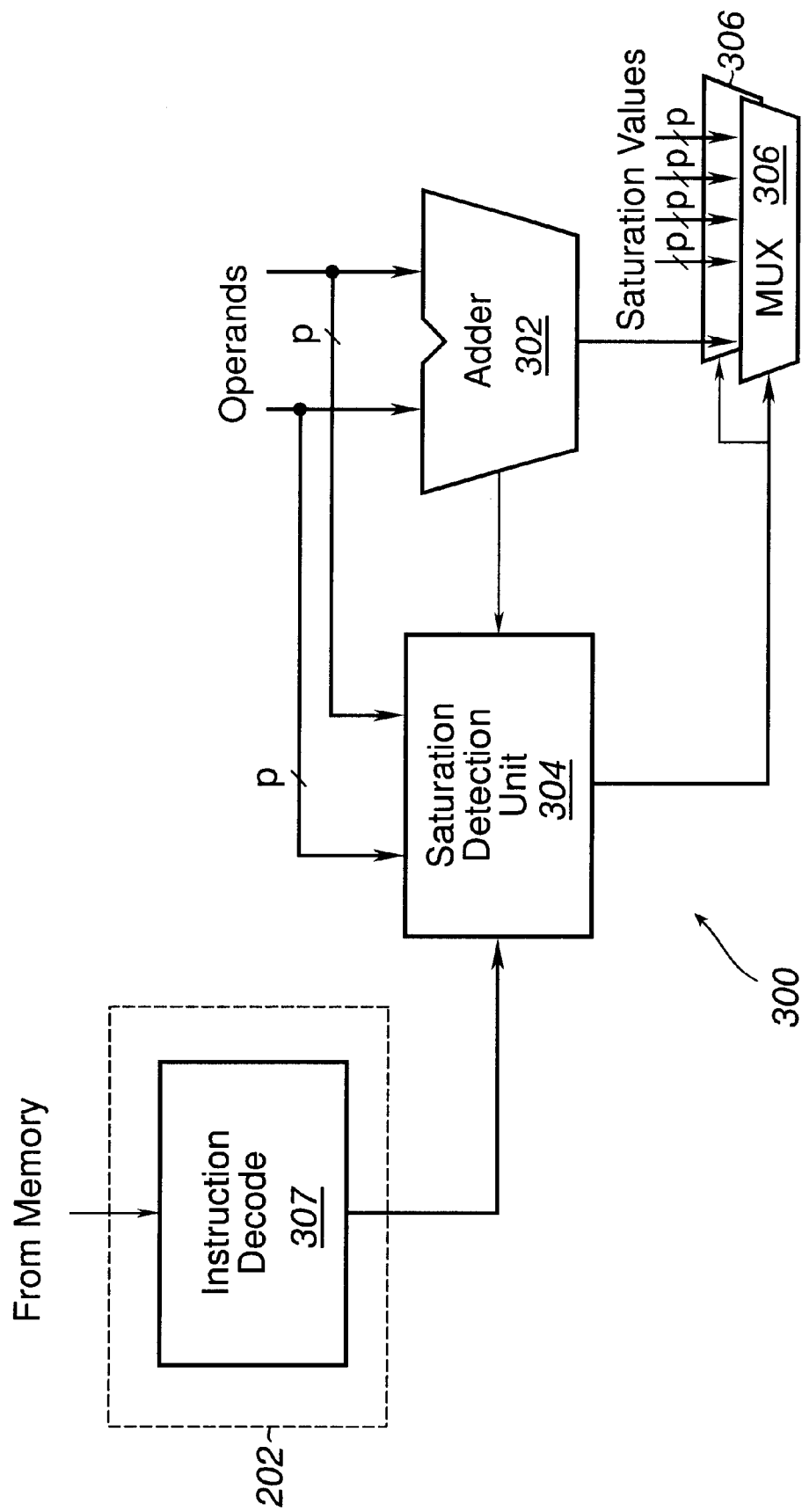
FIG. 3A illustrates, in block diagram form, a saturation detection mechanism in accordance with an embodiment of the present invention.

Refer now to FIG. 3 illustrating a portion 300 of vector unit 210 in accordance with an embodiment of the present invention. Portion 300 includes adder 302, saturation detection unit 304 and multiplexer (MUX) 306. Operands to be added or subtracted, depending on the instruction to be executed, are input to adder 302. Additionally, the subvector operands are provided to saturation detection unit 304.

Figure 3B:
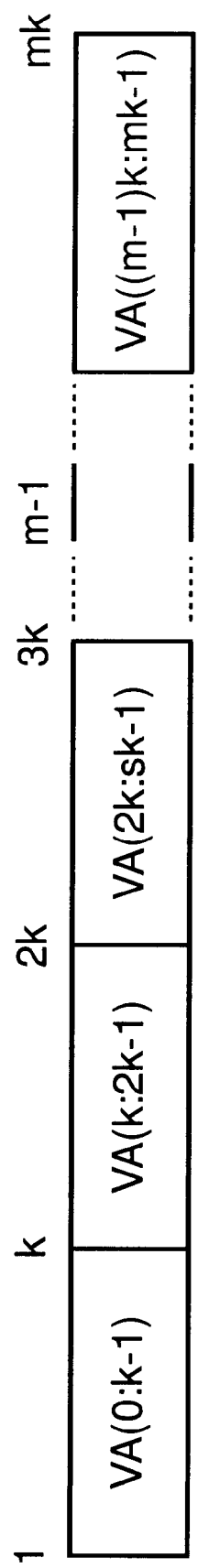
FIG. 3B illustrates a vector operand used in accordance with an embodiment of the present invention.

An exemplary vector operand, VA, is illustrated in FIG. 3B. As discussed hereinabove, corresponding vector arithmetic instructions may operate on operands having different lengths. A smallest operand may have a plurality, k, bits of data. Vector operand VA, in FIG. 3B, includes a plurality, m, portions, each of which is of length k. Thus, a maximum vector operand length may be m·k data bits. Vector instructions operate on subvector operands having data lengths which may be from k bits, to the maximum, m·k bits, with a corresponding instruction for each length subvector operand. (Hereinafter, the full operands will be generically referred to as vector operands, and the instruction data type, or k-length, operands will be referred to as subvector operands.) For example, there may be corresponding vector instructions for adding, in parallel, a first plurality of pairs of byte-length operands in which k=8, a second plurality of pairs of half-word, or sixteen bit operands, one or more pairs of word length, or thirty-two bit, operands, etc. Smallest subvector operands will be presumed to be byte-length operands, however in an alternative embodiment, the smallest operand may have other predetermined bit lengths, provided that the bit-length is a power of two. In an exemplary embodiment having a maximum data length of thirty-two bits, the first plurality may include four pairs, and the second plurality may include two pairs. In addition of the full thirty-two bit, operands may also be provided.

Figure 3C:
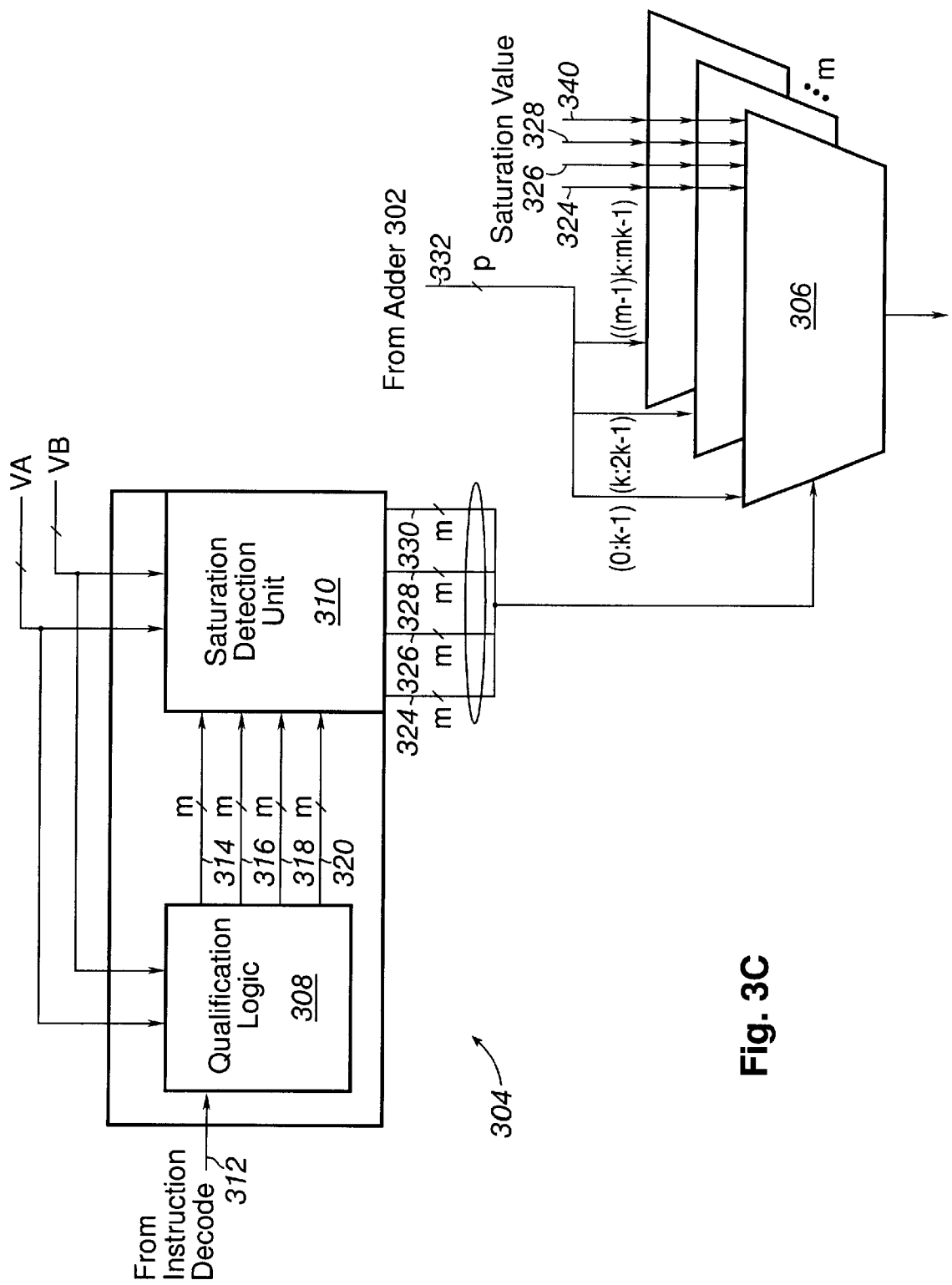
FIG. 3C illustrates, in block diagram form, a saturation detection unit in accordance with an embodiment of the present invention.

Refer now to FIG. 3C illustrating saturation detection unit 304 in greater detail. The sign bits of vector operands, VA and VB, are input to qualifier logic 308. Operands VA and VB are provided to saturation select unit 310. Additionally, instruction decode signal 312 is input to qualifier logic 308 to inform qualifier logic 308 which vector instruction is being executed. In response to the operands, and the instruction being executed, qualifier logic 308 outputs a plurality of m-bit-wide first signals 314–320.

Each qualifier signal is generated in accordance with a corresponding Boolean equation. Qualifier 314, unsigned _ov_qual, is determined in accordance with Boolean Equation (1):

$$\text{unsigned\_ov\_qual} = \text{add} \ \& \ \overline{\text{signed}} \ \& \ \text{sat\_mode} \qquad (1).$$

The Boolean variables add, signed, and sat_mode are determined in response to the instruction being executed. If an addition is being performed, add, has the value TRUE, otherwise, if a subtraction is being performed, the Boolean variable add is FALSE. Similarly, the Boolean variable, signed, is TRUE if a signed arithmetic operation is being performed, and is FALSE otherwise. If the instruction being executed is in saturating mode, the Boolean variable sat_mode is TRUE. It is FALSE if the instruction is a modulo mode instruction. These signals are provided by instruction decode logic 307 in instruction unit 202. Qualifier signal 316, unsigned_uv_qual is determined in accordance with Boolean Equation (2):

$$\text{unsigned\_uv\_qual} = \text{sub} \& \overline{\text{signed}} \& \text{sat\_mode} \quad (2).$$

The Boolean variable sub is TRUE if a subtraction is being performed and is FALSE if an addition is being performed. Thus, $\overline{\text{sub}}$=add. A third qualifier signal 318, signed_ov_qual, is determined using Boolean Equation (3):

$$\text{signed\_ov\_qual} = \text{signed} \& \text{sat\_mode} \& \overline{\text{vb\_sign}} \& \overline{\text{va\_sign}} \quad (3).$$

Qualifier signal 320, signed_uv_qual, is determined in accordance with Boolean Equation (4):

$$\text{signed\_uv\_qual} = \text{signed} \& \text{sat\_mode} \& \text{vb\_sign(s)} \& \text{va\_sign(s)} \quad (4).$$

Each of first signals 314, 316, 318, and 320 includes m bits. Each of the m bits is generated by forming the logical AND of the corresponding qualifier signal, as determined from its respective Boolean equation, with a logical OR of a plurality of Boolean data-type signals. Additionally, with respect to first signals 318 and 320, data-type dependent sign bits, generically denoted va_sign and vb_sign, are used, as described further below. Operands having a maximum length of m·k bits supports a plurality, l, of data types, where l equals the base-two logarithm of m. A first data type has a length of m·k bits, a second data type has a length of (m·k)/2 bits, a third data type has a length of $(m \cdot k)/2^2$ bits, etc., and an lth data type has a length of $(m \cdot k)/2^l = (m \cdot k)/m = k$, consistent with the definition of k. Associated with each data type is a corresponding Boolean signal, datatype_1, datatype_2, . . . , datatype_l. For a sum or difference operation on a sth data type, the corresponding Boolean signal, data_type_s is asserted and the remaining Boolean signals are negated.

To make this concrete, consider the exemplary embodiment discussed hereinabove, in which the maximum length of the operand is thirty-two data bits (thirty-six bits total) including four data bytes (m=4, k=8). The first data type is thirty-two bits in size, the second data type has sixteen bits, and the third data type is a byte, or eight bits. The corresponding length Boolean signal is generated as the logical OR of three Boolean signals associated with each of the data types, datatype_1, datatype_2, and datatype_3, which using a more typical terminology, may be referred to as word, half_word, and byte, respectively.

In this embodiment, each of the four bits of first signals 314, 316, 318, and 320, are then formed as specified in Equations (1)–(4), additionally logically combined with one or more of the Boolean signals datatype_1, datatype_2, and datatype_3, or equivalently, word, half_word, and byte. Thus, unsigned_ov_qual(0)=unsigned_ov_qual & (byte | word | half-word), unsigned_ov_qual(1)=unsigned_ov_qual & byte, unsigned_ov_qual(2)=unsigned_ov_qual & (byte | half-word), unsigned_ov_qual(3)=unsigned_ov_qual & byte. (5).

unsigned_uv_qual(0)=unsigned_uv_qual & (byte | word | half-word), unsigned_uv_qual(1)=unsigned_uv_qual & byte, unsigned_uv_qual(2)=unsigned_uv_qual & (byte | half-word), unsigned_uv_qual(3)=unsigned_uv_qual & byte. (6).

signed_ov_qual(0)=signed & sat_mode & $\overline{\text{va(0)}}$ & $\overline{\text{vb(0)}}$ & (byte | half-word | word), =signed & sat_mode & $\overline{\text{va(0)}}$ & $\overline{\text{vb(0)}}$, signed_ov_qual(1)=signed & sat_mode & $\overline{\text{va(8)}}$ & $\overline{\text{vb(16)}}$ & byte, signed_ov_qual(2)=signed & sat_mode & $\overline{\text{va(16)}}$ & $\overline{\text{vb(16)}}$ &

(byte | half-word), signed_ov_qual(3)=signed & sat_mode & $\overline{\text{va(24)}}$ & $\overline{\text{vb(24)}}$ & byte (7).

signed_uv_qual(0)=signed & sat_mode & va(0) & vb(0) &

(byte | half-word | word),

=signed & sat_mode & va(0) & vb(0), signed_uv_qual(1)=signed & sat_mode & va(8) & vb(8) & byte, signed_uv_qual(2)=signed & sat_mode & va(16) & vb(16) &

(byte | half-word), signed_uv_qual(3)=signed & sat_mode & va(24) & vb(24) & byte (8).

The four bits constituting first signals 314, 316, 318, 320, in the exemplary embodiment, are associated with boundaries between the data values, for each of the data types supported by the thirty-two bits of the vector operand. Hence, bytewise operations would assert each of the four bits in the one of first signals 314, 316, 318, 320 corresponding to the operation being performed. For an executing instruction operating on half-word (sixteen bit) length subvector operands, bit numbers zero and two are asserted, and for word length operands, only bit number zero is asserted. Additionally, for signed operations, corresponding to first signals 318 and 320, the sign bit for operand at the associated boundary is ANDed with the other Boolean signals generating first signals 318 and 320.

Thus, in the general case, each of the m bits of the first signals 314, 316, 318, and 320 is associated, in order, with the successive boundaries between values of the smallest subvector operand. Then, for each of the data types, if the corresponding boundary is also a boundary for that data type, data type Boolean signal associated with that data type appears in the logical ORed expression for the associated one of the m bits, as shown above in the exemplary embodiment. Additionally, the subvector operand type dependent sign bits va(s) and vb(s) correspond to the generically denoted sign bit signals va_sign and vb_sign, respectively, discussed above in conjunction with Equations (3) and (4). These are logically ANDed with the other Boolean signals in generating first signals 318 and 320, as Boolean Equations (7) and (8) hereinabove demonstrate with respect to the exemplary embodiment.

First signals 314–320 are provided to saturation select unit 310. Additionally, saturation select unit 310 receives vector operands VA and VB. Saturation select unit 310 provides a plurality of second signals 324–330 to a plurality, m, of multiplexers (MUX) 306, discussed further below. Each of second signals 324–330 includes a plurality, m bits. In the exemplary embodiment in which the vector operands VA and VB are thirty-two bits in size, second signals 324–330 each include four bits. These are generated in accordance with the following Boolean Equations:

sel_unsigned_ov(0)=cout(1) & unsigned_ov_qual(0), sel_unsigned_ov(1)=(cout(10) & unsigned_ov_qual(1)) | (sel_sign_ov(0)

& (word | half-word)), sel_unsigned_ov(2)=(cout(19) & unsigned_ov_qual(2)) (sel_sign_ov(0)

& word), sel_unsigned_ov(3)=(cout(28) & unsigned_ov_qual(3)) (sel_sign_ov(0)

& word) | (sel_sign ov(2) & half-word)          (9).

sel_unsigned_uv(0)=$\overline{(\text{cout}(1)}$ & unsigned_uv_qual(0)), sel_unsigned uv(1)=$\overline{(\text{cout}(10)}$ & unsigned_uv_qual(1)) | (sel_sign_uv(0)

& (word | half-word)), sel_unsigned_uv(2)=$\overline{(\text{cout}(19)}$ & unsigned_uv_qual(2)) |

(sel_sign_uv(0)

& word), sel_unsigned_uv(3)=$\overline{(\text{cout}(28)}$ & unsigned_uv_qual(3)) I (sel_sign_uv(0)

& word) | (sel_sign_uv(2) & half-word)          (10).

sel_signed_ov(0)=cout(2) & signed_ov_qual(0), sel_signed_ov(1)=cout(11) & signed_ov_qual(1), sel_signed_ov(2)=cout(20) & signed_ov_qual(2), sel_signed_ov(3)=cout(29) & signed_ov_qual(3)          (11).

sel_signed_uv(0)=$\overline{\text{cout}}$(2) & signed_uv_qual(0), sel_signed_uv(1)=$\overline{\text{cout}(11)}$ & signed_uv_qual(1), sel_signed_uv(2)=$\overline{\text{cout}(20)}$ & signed_uv_qual(2), sel_signed_uv(3)=$\overline{\text{cout}(29)}$ & signed_uv_qual(3)          (12)

Signals $c_0(i)$ and $c_1(i)$ represent carry-out bits from a most significant bit (MSB) and a next to most significant bit (NMSB) of the result produced by the operation on subvector operands va and vb corresponding to the executing instruction. For the exemplary embodiment, the carry-out signals are generated for the bit numbers as indicated in Equations (9)–(12) above.

Carry-out signals $c_0$ and $c_1$ are generated using carry lookahead circuitry included in carry-out logic 310. Such carry lookahead circuitry generates carry-out signals $c_j$, j=0,1, . . . , n·1, for n-bit operands in accordance with:

$g_j = va_j$ & $vb_j$;

$p_j = va_j \oplus vb_j$, and $c_{j-1} = g_j | (c_j \& p_j), j=n-1, \ldots, 1.$          (9).

The $va_j$ and $vb_j$ represent the jth bit of operands va and vb, respectively, and the g are typically referred to as carry generate signals and the $p_j$ are typically referred to as carry propagate signals. Carry-out signals $c_0$ and $c_1$ generated according to Boolean Equation (9) may then be logically combined with the first signals in accordance with Boolean Equations (5)–(8) using conventional combinatoric logic, such as inverters, AND gates, OR gates, and their complements.

Figure 4:
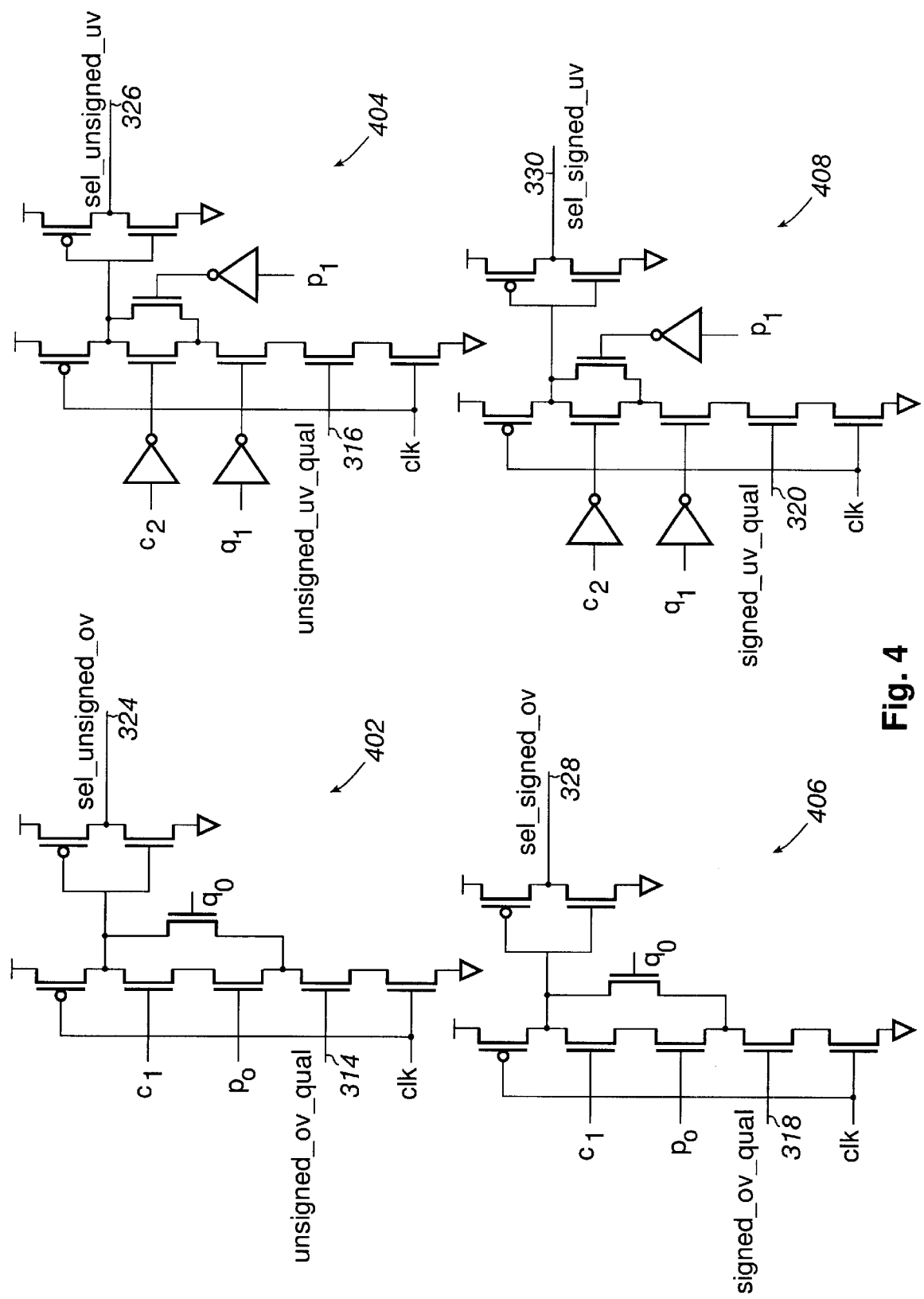
FIG. 4 illustrates a portion of carry-out logic in accordance with an embodiment of the present invention.

Alternatively, the conventional combinatoric logic may be folded into the carry lookahead circuitry implementing Boolean Equation (9). In order to generate second signals 324–330, final carry lookahead logic may be implemented as illustrated in FIG. 4. Control signal 324, defined in Boolean Equation (5), may be generated using dynamic logic stack 402, wherein the signals $c_1$, $g_0$, $p_0$, $c_2$, $g_1$, and $p_1$ are as defined in Boolean Equation (9). Similarly, by using dynamic logic stacks 404, 406, and 408 in the final carry lookahead logic, control signal 326, control signal 328, and control signal 330 may be generated, respectively.

MUX 306 selects for outputting one of a plurality of input signals 332–340 in response to second signals 324–330. Input signal 332 is received from an output of adder 302. Signals 334–340 represent predetermined saturation values for each data type subvector operand. In the general case, there are 4·m such values. If none of the second signals 324·330 is asserted, MUX 306 selects for the output from adder 302. Otherwise, the corresponding one of the saturation values, in accordance with the control signal asserted, is selected for outputting via MUX 306.

In this way, output selection is implemented without adding delays. The delay in selecting the output is substantially the same as the delay to compute the results in adder 302. The saturation detection is done in parallel with the sum generation. Thus, by the time the sum is produced, the saturation condition is determined, and the output selected when the sum becomes available, and additional delays from the saturation detection are thereby avoided.

Although the present invention and its advantages have been described in detail, it should be understood that various changes, substitutions and alterations can be made herein without departing from the spirit and scope of the invention as defined by the appended claims.

What is claimed is:

1. A saturation detection apparatus comprising:
   a saturation detection unit having first and second operand inputs operable for receiving first and second vector operands, said saturation detection unit operable for receiving an instruction signal, said saturation detection unit outputting one or more second signals in response to said first and second operands and said instruction signal; and
   selection circuitry operable for receiving said one or more second signals, a arithmetic result signal from an arithmetic unit, one or more of saturation value signals, wherein said selection circuitry selects one of said result signal and said plurality of said saturation value signals in response to said one or more second signals.

2. The apparatus of claim 1 wherein said first and second vector operands include a plurality of data portions, each of said data portions being operable, alone or in combination with preselected other data portions, as first and second operands of a corresponding vector instruction.

3. The apparatus of claim 1 wherein said selection circuitry comprises at least one multiplexer (MUX).

4. The apparatus of claim 1 wherein said saturation detection unit comprises:
   qualifier logic coupled to said first and second inputs, said qualifier logic operable for receiving said first and second vector operands and said instruction signal, said qualifier logic outputting a plurality of first signals; and
   select logic operable for receiving said plurality of first signals said select logic outputting said one or more second signals in response to said plurality of first signals.

5. The apparatus of claim 4 wherein said select logic comprises:
   a carry lookahead unit operable for outputting a carry-out bit from a next to most significant bit (NMSB) of a preselected operand pair, carry-propagate bits from a most significant bit (MSB) and said NMSB of said preselected operand pair, carry-generate bits of said MSB and said NMSB of said preselected operand pair, and a carry-in bit for said MSB of said preselected operand pair;

a first plurality of logic circuits operable for receiving a first plurality of input signals, said first plurality of input signals including said carry-propagate bit from said MSB, said carry-generate bit of said MSB, said carry-out bit of said NMSB and a first set of said plurality of first signals, wherein said first plurality of logic circuits outputs a first set of said one or more second signals in response to said plurality of input signals; and a second plurality of logic circuits operable for receiving a second plurality of input signals, said second plurality of input signals including said carry-propagate bit of said NMSB, said carry-generate bit of said NMSB, said carry-in bit for said NMSB and a second set of said plurality of first signals, wherein said second plurality of logic circuits outputs a second set of said one or more second signals in response to said second plurality of input signals.

6. The apparatus of claim 4 wherein said carry-out logic comprises:

a carry lookahead unit operable for outputting a carry-out bit from a next to most significant bit (NMSB) of a preselected operand pair, and a carry-out bit from a most significant bit of said preselected operand pair;

a first plurality of logic circuits operable for receiving said carry-out bit from said NMSB and a first set of said plurality of first signals, said first plurality of logic circuits outputting a first plurality of said selection signals in response thereto; and a second plurality of logic circuits operable for receiving said carry-out bit from said NMSB and a second plurality of said first signals, said second plurality of logic circuits outputting a first set of said one or more second signals in response thereto.

7. The apparatus of claim 6 wherein said first plurality of first signals includes signed_ov_qual and signed_uv_qual signals, and said second plurality of first signals includes unsigned_ov_qual and unsigned_uv_qual signals.

8. The apparatus of claim 4 wherein said plurality of first signals includes first, second third and fourth first signals, said first signal generated in response to a first logical value defined by add & $\overline{signed}$ & sat_mode, said second signal generated in response to a logical value defined by $\overline{sub}$ & signed & sat_mode, said third signal generated in response to third logical value defined by signed & sat_mode & $\overline{vb\_sign}$ & $\overline{va\_sign}$, and said fourth signal generated in response to a fourth logical value defined by signed & sat_mode & vb_sign & va_sign, wherein said add, signed and sat-mode signals are generated from said instruction signal, said add has a first predetermined Boolean value when an addition instruction is executed and a second predetermined Boolean value when a subtraction instruction is executed, said signed signal has said first Boolean value when a signed instruction is executed and said second Boolean value when an unsigned instruction is executed, said sat-mode signal has said first Boolean value when a saturation mode instruction is executed and said second Boolean value when a modulo mode instruction is executed, and said va_sign and vb_sign signals represent preselected sign bits of first and second operands corresponding to an executing instruction.

9. The apparatus of claim 8 wherein each of said first, second, third and fourth first signals, further include a plurality, m of bits, each bit being generated in further response to a logical AND of said first, second, third and fourth logical values with a logical OR of one or more data type signals for each bit of said plurality of bits, wherein said one or more data type signals are generated in response to a subvector operand length.

10. A method of saturation detection comprising the steps of:

generating a set of first signals in response to an executing instruction;

generating a set of second signals in response to first and second carry-out signals and said set of first signals; and selecting for outputting one of a set of output signals including a result signal and a predetermined set of saturation value signals in response to said set of second signals, wherein said first and second carry-out signals are generated in response to a pair of subvector operands, and said result signal is generated in response to said executing instruction.

11. The method of claim 10 wherein said pair of subvector operands comprise first and second vector operands.

12. The method of claim 10 wherein said selecting step comprises the steps of:

providing said second signals to at least multiplexer (MUX);

providing said set of output signals to corresponding inputs of said at least one MUX; and controlling said at least one MUX in response to said second signals.

13. The method of claim 10 wherein said first carry-out signal comprises a carry-out signal generated by a most significant bit (MSB) of said pair of subvector operands; and said second carry-out signal comprises a carry-out signal generated by a next to most significant bit (NMSB) of said pair of subvector operands.

14. The method of claim 10 wherein said step of generating a set of second signals comprises the steps of:

ANDing a first one of said set of first signals with said first carry-out signal;

ANDing a second one of said set of signals with a complement of said first carry-out signal;

ANDing a third one of said set of first signals with said second carry-out signal; and ANDing a fourth one of said set of first signals with a complement of said second carry-out signal.

15. The method of claim 10 wherein said step of generating a set of first signals comprises the steps of:

generating a first one of said set of first signals in response to a logical AND of an add signal with a complement of a signed signal and with a sat_mode signal, wherein said add signal, said signed signal and said sat_mode signal are provided in response to said executing instruction;

generating a second one of said set of first signals in response to a logical AND of a sub signal with said complement of said signed signal and with said sat_mode signal, wherein said sub signal is provided in response to said executing instruction;

generating a third one of said set of first signals in response to a logical AND of said signed signal with said sat_mode signal and with sign bits of each operand of said pair of subvector operands; and generating a fourth one of said set of first signals in response to a logical AND of said signed signal with said sat_mode signal and with complements of said sign bits of each operand of said pair of subvector operands.

16. The method of claim 15 wherein each signal of said set of first signals includes a plurality of bits, and wherein said step of generating said set of first signals further comprises the step of ANDing each of said first, second, third and fourth ones of said set of first signals with a logical OR of one or more data type signals for each bit of said plurality of bits, wherein said one or more data type signals are generated in response to an subvector operand length.

17. The method of claim 16 wherein said plurality of bits includes m bits.

18. A data processing system comprising:

a central processing unit (CPU);

a memory operable for communicating instructions and operand data to said CPU, said CPU comprising:

instruction decode circuitry operable for receiving said instructions;

an arithmetic unit operable for receiving said operand data, and outputting a result signal in response to said operand data, and an instruction; and saturation selection circuitry, coupled to said memory, wherein said saturation selection circuitry is operable for receiving said operand data from said memory, and operable for selecting a one of a plurality of output signals, wherein said plurality of output signals includes said result signal and a preselected set of saturation signals, said saturation detection circuitry selecting said one of said plurality in response to said operand data and an instruction signal from said decode circuitry.

19. The data processing system of claim 18 wherein said CPU further comprises a vector unit, said vector unit including said arithmetic unit and said selection circuitry.

20. The data processing system of claim 18 wherein said saturation selection circuitry comprises:

a saturation detection unit having first and second operand inputs operable for receiving first and second operand data, said saturation detection unit operable for receiving said instruction signal, said saturation detection unit outputting a plurality of second signals in response to said first and second data and said instruction signal; and selection circuitry operable for receiving said plurality of second signals and said plurality of output signals.

21. The data processing system of claim 20 wherein said selection circuitry comprises at least one multiplexer (MUX).

22. The data processing system of claim 20 wherein said saturation detection unit comprises:

qualifier logic operable for receiving said first and second operand data and said instruction signal, said qualifier logic outputting a plurality of first signals, each of said plurality of first signals including m bits; and select logic operable for receiving said plurality of first signals said select logic outputting said plurality of second signals in response to said plurality of first signals.

23. The data processing system of claim 22 wherein said plurality of first signals includes first, second, third and fourth first signals, said first signal generated in response to a first logical value defined by add & $\overline{\text{signed}}$ & sat_mode, said second signal generated in response to a logical value defined by sub & $\overline{\text{signed}}$ & sat_mode, said third signal generated in response to third logical value defined by signed & sat_mode & $\overline{\text{vb\_sign}}$ & $\overline{\text{va\_sign}}$, and said fourth signal generated in response to a fourth logical value defined by signed & sat_mode & vb_sign & va_sign, wherein said add, signed and sat-mode signals are generated from said instruction signal, said add has a first predetermined Boolean value when an addition instruction is executed and a second predetermined Boolean value when a subtraction instruction is executed, said signed signal has said first Boolean value when a signed instruction is executed and said second Boolean value when an unsigned instruction is executed, said sat-mode signal has said first Boolean value when a saturation mode instruction is executed and said second Boolean value when a modulo mode instruction is executed, and said va_sign and vb_sign signals represent sign bits of first and second operands corresponding to an executing instruction.

24. The data processing system of claim 23 wherein each of said first, second, third and fourth first signals further include a plurality, m, of bits, each bit being generated in further response to a logical AND of said first, second, third and fourth logical values with a logical OR of one or more data type signals for each bit, said data type signals generated from said instruction signal.

* * * * *

UNITED STATES PATENT AND TRADEMARK OFFICE
CERTIFICATE OF CORRECTION

PATENT NO. : 6,499,046 B1
DATED : December 24, 2002
INVENTOR(S) : Huy Van Nguyen and Charles Philip Roth It is certified that error appears in the above-identified patent and that said Letters Patent is hereby corrected as shown below:

Column 5,
Lines 53 and 58, please insert a new line following "byte,".

Column 6,
Line 6, please replace "$\overline{va(24)}$" with -- $\overline{va(24)}$ --.

Column 7,
Line 15, please replace "I" with -- | --.

Line 22, please replace "$\overline{cout(2)}$" with -- $\overline{cout(2)}$ --.

Signed and Sealed this

Thirteenth Day of April, 2004

JON W. DUDAS
*Acting Director of the United States Patent and Trademark Office*